3,021,294
FLOOR POLISH COMPOSITIONS
George J. Fuld, Wakefield, and Richard C. Brogle, Watertown, Mass., and Melvin Fuld, Baltimore, Md., assignors to Fuld Brothers, Inc., a corporation of Maryland
No Drawing. Filed May 26, 1958, Ser. No. 737,521
5 Claims. (Cl. 260—28.5)

This invention relates to improvements in floor polishes.

Important among the characteristics of floor polishes or finishes are their appearance and wearing properties. In appearance, such products should provide a high gloss, clarity, depth and richness. Their wearing properties should include durability, scuff-resistance, toughness, and resistance to water. Also of importance are the characteristics of slipperiness of the dried film, levelling and spreading characteristics, and resistance to discoloration.

Although years of research have been directed to the improvement of these qualities, much remains to be done. Marked improvements in many of these properties have been realized, in accordance with the present invention, by the incorporation of relatively small proportions of colloidal clays and colloidal metals, particularly in connection with self-polishing waxes and polymer floor finishes. Among the improvements resulting from such additions are increased luster, improved jetness, reduced slipperiness, a modification of the configuration of the droplets from the usual spherical form towards a more planar form, improved transparency and translucency characteristics, and increased water resistance, particularly in connection with wax emulsions.

Whereas the most outstanding results have been achieved with colloidal silver, improved results have also been attained with the colloidal forms of copper, gold, mercury, tin and aluminum. Among the colloidal clays which have produced improved results are bentonite, princeton and cananim clays.

The colloidal materials have been produced by conventional methods and have been added to conventional floor polishes and coatings during their manufacture under ordinary operating conditions indicating that particular temperature conditions are not critical. One of the most amazing aspects of the present invention is the tremendous improvement which attends the addition of minute quantities of the colloidal materials. The various colloidal materials have been productive of extremely good results in ranges of 0.001% to 0.1%, a preferred range including 0.005% to 0.008% based upon total weight of the composition to which the addition is made.

It is probable that the improved results can be attributed in part to a modification of the configuration of emulsified particles of wax and/or resin present. Ordinarily, these particles assume a spherical configuration. The addition of the colloidal materials as contemplated by the present invention seems to produce a flattening effect on these particles whereby they tend to lie in a plane.

Accordingly, it is among the objects of the present invention to provide a floor polish composition comprising a wax emulsion and from 0.001 to 0.1% by weight of a colloidal material selected from the group consisting of colloidal metals and colloidal clays, a preferred range of these colloidal materials being from 0.005 to 0.008% by weight. The colloidal material is preferably a metal and since the most outstanding results achieved thus far have been with colloidal silver, this material will be preferred above the others. The composition may contain an organic polymer emulsion such as a polystyrene emulsion and in one embodiment, the composition contains an excess of 50% polystyrene emulsion, not more than 25% resin solution and less than 25% wax emulsion.

A preferred embodiment of the invention contemplates a wax emulsion wherein the wax is carnauba.

Uniformly improved results have been achieved by the application of this invention to wide varieties of formulas such as those listed in a book entitled "Emulsions and Detergents," ninth edition, by Carbide and Carbon Chemicals Company, and in a number of technical bulletins, including those numbered 5, 6A and 7, of UBS Chemical Corporation, Cambridge, Massachusetts.

Examples of such improved compositions are as follows:

VOLATILE AMINE WATER-RESISTANT RUBLESS POLISHES

| Ingredients | Parts by Weight | | | | | |
|---|---|---|---|---|---|---|
| | Ex. 1 | Ex. 2 | Ex. 3 | Ex. 4 | Ex. 5 | Ex. 6 |
| Carnauba wax | 40.0 | 40.9 | 40.0 | 40.0 | 40.0 | 40.0 |
| Oleic acid | 8.0 | 8.0 | 8.0 | 8.0 | 8.0 | 8.0 |
| Morpholine | 5.0 | | | 5.0 | | |
| Dimethyl ethanolamine (70%) | | 5.0 | | | 5.0 | |
| Diethyl ethanolamine | | | 4.0 | | | 4.0 |
| Borax | | 2.0 | | | 2.0 | |
| Water | 240.0 | 245.0 | 240.0 | 240.0 | 245.0 | 240.0 |
| Colloidal silver | .014 | | .023 | | .005 | |
| Colloidal copper | | .032 | | | | |
| Bentonite clay | | | | .16 | .010 | |
| Princeton clay | | | | | | .29 |

SPOT RESISTANT RUBLESS POLISHES

| Ingredients | Ex. 7 | Ex. 8 | Ex. 9 | Ex. 10 | Ex. 11 | Ex. 12 |
|---|---|---|---|---|---|---|
| Carnauba wax | 40.0 | 40.0 | 40.0 | 40.0 | 40.0 | 40.0 |
| Oleic acid | 8.0 | 8.0 | 8.0 | 8.0 | 8.0 | 8.0 |
| Triethanolamine | 4.0 | 3.0 | 3.0 | | 1.0 | 1.6 |
| Monoethanolamine | | 1.0 | | 1.5 | 1.0 | |
| Potassium hydroxide | 0.5 | | | | | |
| Morpholine | | | 2.0 | 2.0 | 1.5 | |
| Diethyl ethanolamine | | | | | | 2.4 |
| Water | 240.0 | 240.0 | 240.0 | 240.0 | 240.0 | 240.0 |
| Colloidal silver | .001 | | | | | |
| Colloidal tin | | .004 | | | | |
| Colloidal gold | | | .005 | | | |
| Colloidal mercury | | | | .020 | | |
| Colloidal aluminum | | | | | .030 | |
| Bentonite | | | | | | .10 |

| Base Composition | Parts by Weight | | |
|---|---|---|---|
| Polystyrene emulsions | 70 | 60 | 80 |
| Resin solutions | 20 | 25 | 15 |
| Carnauba wax emulsions | 10 | 15 | 5 |
| Addition Product: | | | |
| Ex. 13—Colloidal silver | .005 | .006 | .008 |
| Ex. 14—Colloidal gold | .001 | .002 | .004 |
| Ex. 15—Colloidal copper | .003 | .050 | .100 |
| Ex. 16—Colloidal tin | .009 | .012 | .024 |
| Ex. 17—Colloidal aluminum | .007 | .009 | .018 |
| Ex. 18—Colloidal mercury | .006 | .008 | .011 |
| Ex. 19—Bentonite | .025 | .075 | .090 |
| Ex. 20—Princeton clay | .100 | .875 | .450 |

From Examples 7 and 14 it is seen that minimum amounts of .001% by weight of colloidal material may be used and from Examples 2, 11 and 19 it will be seen that amounts of about .03% by weight may be used.

The colloidal materials can be prepared according to any conventional method as exemplified by that set forth in "Experiments in Colloid Chemistry" by E. A. Hauser and J. E. Lynn, published 1937 by McGraw-Hill Book Company, New York, New York. As will appear in Experiment 22 of this book, colloidal silver can be prepared as follows:

"To a solution of 4 g. of commercial dextrin and 4 g. of sodium hydroxide in 100 cc. of water, add 20 cc. of a 15 percent silver nitrate solution. A precipitate of silver oxide forms. Let stand for 30 minutes. During this time the precipitate turns reddish brown and the dextrin reduces the silver oxide to metallic silver. At the end of 30 min. add 100 cc. of 95 percent ethyl alcohol with stirring. After stirring vigorously, let stand about 15 min. and then decant. The sediment is a paste of colloidally dispersed silver. Dilute greatly to form a normally concentrated silver sol."

Procedures for the preparation of others of the colloidal metals contemplated herein have been outlined in the same publication.

It should be understood, however, that the particular method of producing the colloidal materials is not critical nor is the specific composition of the base floor polish of particular significance insofar as the present invention is concerned. Accordingly, the examples set forth herein should not be construed as limiting beyond the scope of the appended claims.

We claim:

1. A floor polish composition comprising a wax emulsion and from about 0.001 to about 0.03% by weight, based upon the emulsion, of a colloidal material selected from the group consisting of colloidal silver, colloidal gold, colloidal copper, colloidal mercury, colloidal tin, colloidal aluminum and colloidal clays.

2. A floor polish composition as set forth in claim 1 wherein said colloidal material is silver.

3. A floor polish composition as set forth in claim 1 wherein said composition contains a polystyrene emulsion.

4. A floor polish composition as set forth in claim 1 wherein said composition contains from 50% to 80% polystyrene emulsion, by weight based upon the composition, and from 5% to 25% wax emulsion, by weight based upon the composition.

5. A floor polish composition as set forth in claim 1 wherein said wax emulsion contains carnauba wax.

References Cited in the file of this patent

UNITED STATES PATENTS

| | | |
|---|---|---|
| 2,057,413 | Bridgeman et al. | Oct. 13, 1936 |
| 2,343,065 | Kumler et al. | Feb. 29, 1944 |
| 2,453,880 | Vanderbilt et al. | Nov. 16, 1948 |
| 2,597,871 | Iler | May 27, 1952 |
| 2,626,870 | Cooke et al. | Jan. 27, 1953 |
| 2,726,961 | Iler | Dec. 13, 1955 |
| 2,754,206 | Olsen | July 10, 1956 |
| 2,908,578 | Barker | Oct. 13, 1959 |

OTHER REFERENCES

The Chemistry and Technology of Waxes by Albin H. Warth (2nd edition), Reinhold Publishing Corp., N.Y., N.Y., pp. 823, 863 and 864.